United States Patent
Liu et al.

(10) Patent No.: US 9,616,535 B2
(45) Date of Patent: Apr. 11, 2017

(54) POSITIONING DEVICE AND POSITONING METHOD USING THE SAME

(71) Applicant: ScienBiziP Consulting (Shen Zhen) Co., Ltd., Shenzhen (CN)

(72) Inventors: Jian-Bo Liu, Shenzhen (CN); Wei-Hua Liu, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 0 days.

(21) Appl. No.: 14/549,815

(22) Filed: Nov. 21, 2014

(65) Prior Publication Data
US 2015/0151394 A1 Jun. 4, 2015

(30) Foreign Application Priority Data
Nov. 29, 2013 (CN) .......................... 2013 1 0617646

(51) Int. Cl.
*B23Q 3/18* (2006.01)
*B23Q 1/00* (2006.01)

(52) U.S. Cl.
CPC .............. *B23Q 3/183* (2013.01); *B23Q 1/009* (2013.01); *Y10T 29/49998* (2015.01)

(58) Field of Classification Search
CPC .... B23Q 1/009; B23Q 1/0081; B23Q 1/0072; B23Q 3/183; B25B 5/061; B25B 5/147; B25B 5/087; B25B 5/08
See application file for complete search history.

(56) References Cited

U.S. PATENT DOCUMENTS

| | | | | |
|---|---|---|---|---|
| 6,024,354 A * | 2/2000 | Yonezawa | ............ | B23Q 1/0081 269/309 |
| 6,988,720 B2 * | 1/2006 | Kawakami | ............. | B23Q 1/009 269/309 |
| 8,087,650 B2 * | 1/2012 | Kuroda | .................. | B23Q 1/009 269/263 |
| 8,177,210 B2 * | 5/2012 | Kitamura | ............... | B23Q 1/009 269/309 |
| 8,235,370 B2 * | 8/2012 | Kawakami | ............. | B23Q 3/082 269/228 |
| 8,590,878 B2 * | 11/2013 | Haruna | .................. | B23Q 1/009 269/309 |

(Continued)

FOREIGN PATENT DOCUMENTS

| | | |
|---|---|---|
| CN | 1849197 A | 10/2006 |
| CN | 102015202 A | 4/2011 |

(Continued)

*Primary Examiner* — Larry E Waggle, Jr.
*Assistant Examiner* — Seahee Yoon
(74) *Attorney, Agent, or Firm* — Steven M. Reiss

(57) ABSTRACT

A positioning device includes a main body, a drive member, and a pin assembly. The main body defines a receiving portion which extends through two opposite ends of the main body. The drive member is partially or completely received in the receiving portion. The pin assembly includes a pin bushing and a pin. The pin bushing is securely coupled to the main body and defines an expansion slot on the sidewalls. The expansion slot extends along a central axis of the pin bushing. The pin is coupled to the drive member and extends through the pin bushing. The drive member is configured to drive the pin to move in the pin bushing, pressing the inner sidewalls of the pin bushing to enlarge a diameter.

11 Claims, 4 Drawing Sheets

(56) References Cited

U.S. PATENT DOCUMENTS

| | | | | |
|---|---|---|---|---|
| 9,242,324 B2* | 1/2016 | Kawakami | ............. | B23Q 3/082 |
| 2006/0055099 A1* | 3/2006 | Haruna | ................ | B23Q 1/0081 |
| | | | | 269/309 |
| 2007/0063406 A1* | 3/2007 | Soroka | ................. | B23Q 1/0072 |
| | | | | 269/309 |
| 2015/0165575 A1* | 6/2015 | Kaji | ........................ | B23Q 3/08 |
| | | | | 269/25 |

FOREIGN PATENT DOCUMENTS

| CN | 102649239 A | 8/2012 |
|---|---|---|
| TW | 201143965 A1 | 12/2011 |

\* cited by examiner

POSITIONING DEVICE AND POSITONING METHOD USING THE SAME

FIELD

The subject matter herein generally relates to the field of automatic machining, and in particular to a positioning device and a positioning method using the position device.

BACKGROUND

A positioning pin is employed to position a workpiece on a fixture during machining

BRIEF DESCRIPTION OF THE DRAWINGS

Implementations of the present technology will now be described, by way of example only, with reference to the attached figures.

DETAILED DESCRIPTION

Figure 1:
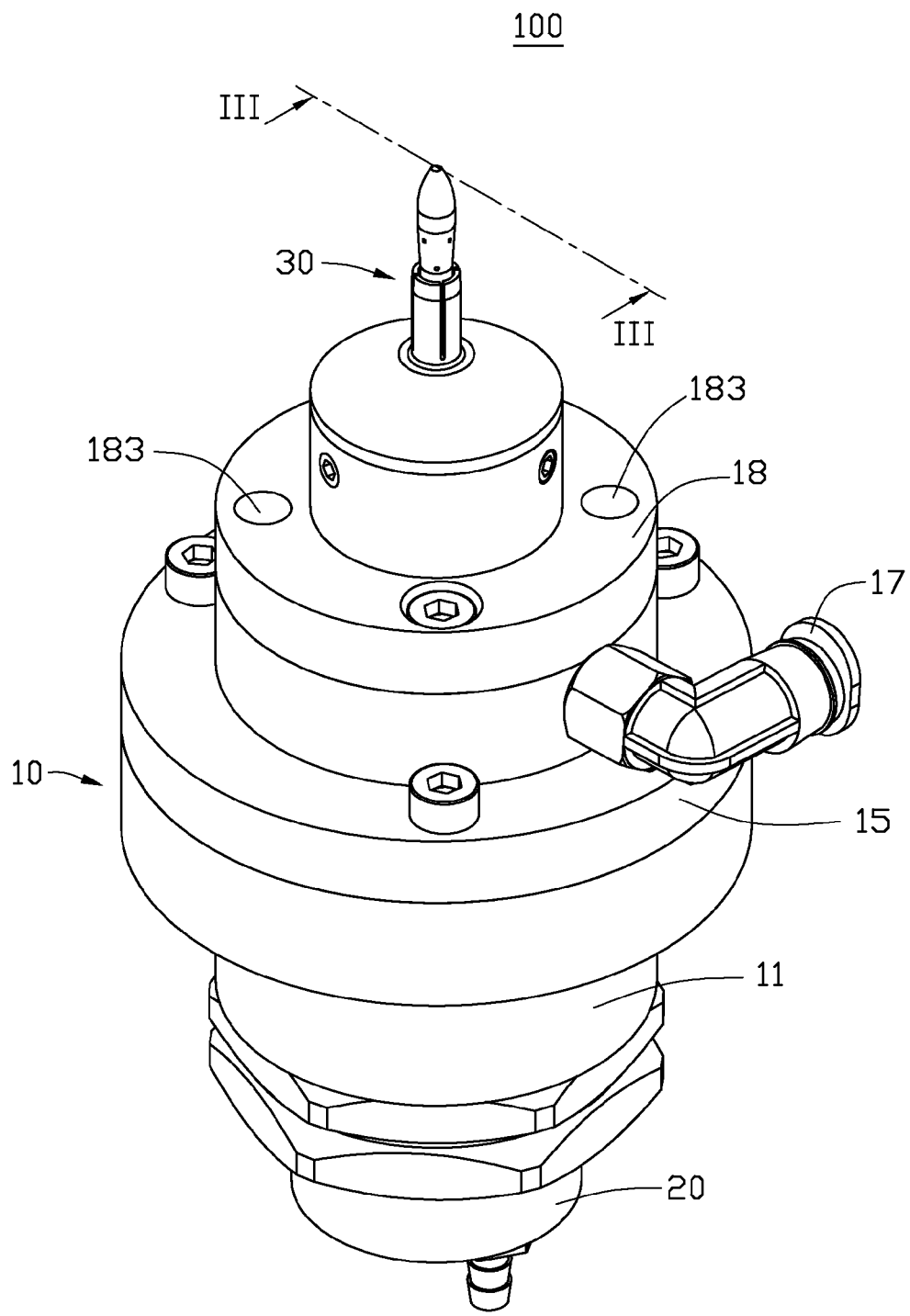
FIG. 1 is an isometric view of an embodiment of a positioning device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A positioning device can include a main body, a drive member, and a pin assembly. The main body can define a receiving portion which extends through two opposite ends of the main body. The drive member can be at least partially received in the receiving portion. The pin assembly can include a pin bushing and a pin. The pin bushing can be securely coupled to the main body and can define an expansion slot on a sidewall. The expansion slot can extend along a central axis of the pin bushing. The pin can be coupled to the drive member and can extend through the pin bushing. The drive member can be configured to drive the pin to move in the pin bushing, and the pin can be capable of pressing the inner sidewalls of the pin bushing to enlarge the pin bushing.

A positioning method applied for the positioning device described above can be configured to position a workpiece. The workpiece can define a positioning hole. The method can include following procedures: positioning the pin bushing into the positioning hole, and driving the pin to move to enlarge the pin bushing to resist the sidewalls of the positioning hole.

Figure 3:
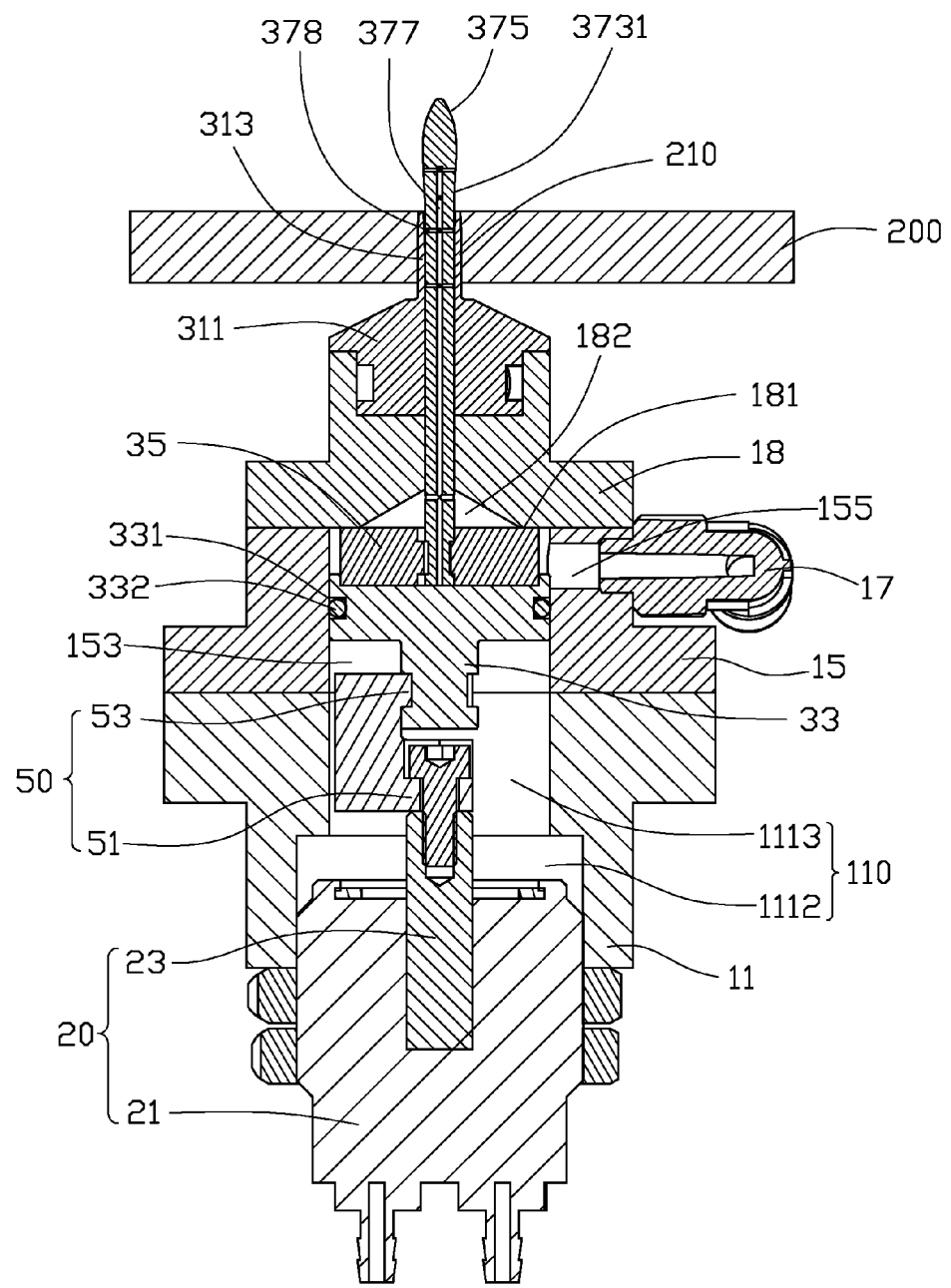
FIG. 3 is a cross-section view of the positioning device of FIG. 1, taken along line III-III.

FIGS. 1 and 3 illustrate an embodiment of a positioning device 100 configured to position a workpiece 200. The workpiece 200 can define a positioning hole 210. The positioning device 100 can include a main body 10, a drive member 20 assembled to the main body 10, a pin assembly 30 assembled to the main body 10, and a connecting member 50 interconnecting with the drive member 20 and the pin assembly 30.

Figure 2:
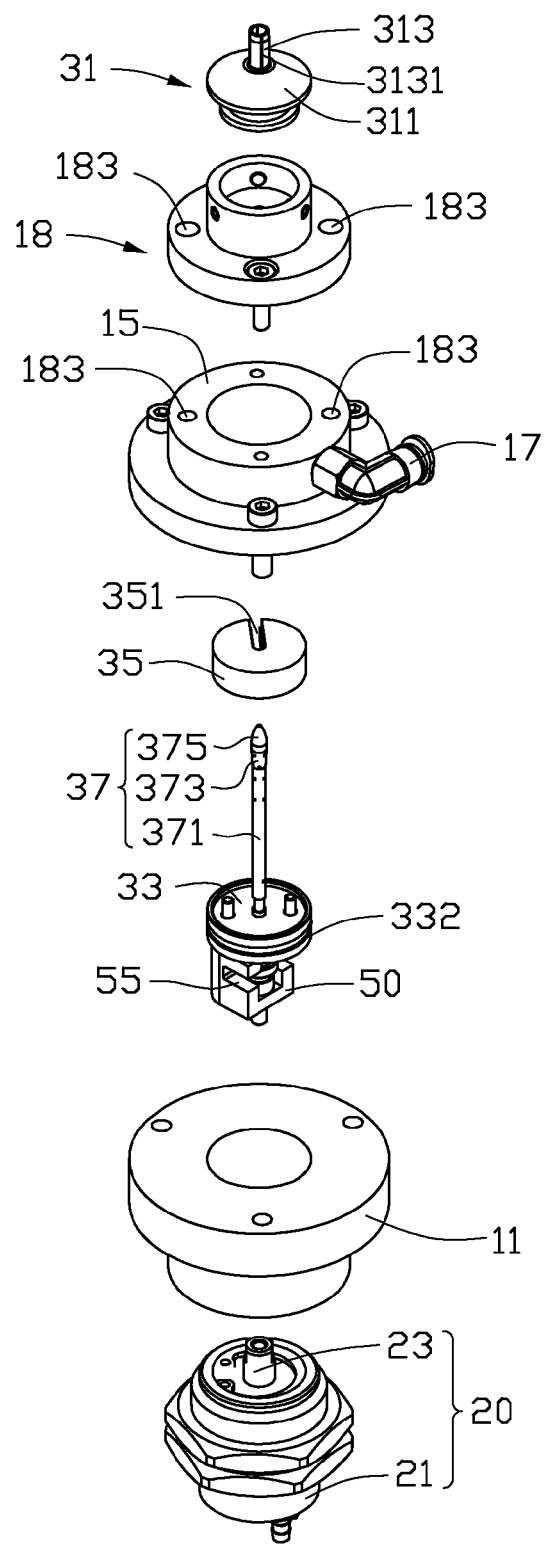
FIG. 2 is an exploded, isometric view of the positioning device of FIG. 1.

FIGS. 2 and 3 illustrate that the main body 10 can include a base 11, a mounting plate 15, an inlet connector 17, and a cover 18. The mounting plate 15 can cover the base 11. The cover 18 can cover the mounting plate 15. The inlet connector 17 can communicate with the mounting plate 15.

The base 11 can define a receiving portion 110. The receiving portion 110 can extend through opposite ends of the base 11 along a central axis of the base 11. The receiving portion 110 can include a first receiving portion 1112, and a second receiving portion 1113 coupled to and communicating with the first receiving portion 1112. An inner diameter of the first receiving portion 1112 can be greater than that of the second receiving portion 1113.

The mounting plate 15 can be mounted on an end of the base 11 adjacent to the second receiving portion 1113. The mounting plate 15 can define a receiving chamber 153. The receiving chamber 153 can extend through two opposite ends of the mounting plate 15, and can match with the second receiving portion 1113. The inner diameter of the receiving chamber 153 can be the same as that of the second receiving portion 1113. The mounting plate 15 can define an inlet hole 155 which communicates with the receiving chamber 153 on a side wall. The inlet connector 17 can be inserted into the inlet hole 155, and be configured to be coupled to an inlet pipe (not show), thus gas can be transported to the receiving chamber 153 through the inlet connector 17, and the inlet hole 155. In at least one embodiment, the base 11 and the mounting plate 15 can be integrated.

The cover 18 can be mounted on an end of the main body 10 away from the mounting plate 15. The cover 18 can define a air chamber 182 on a bottom surface 181. A number of mounting holes 183 can be defined on the cover 18, and can extend through the cover 18 to an inner portion of the mounting plate 15. In at least one embodiment, the cover 18 can define two mounting holes 183 arranged in a straight line.

The drive member 20 can be partially received in the first receiving portion 1112. The drive member 20 can include a drive portion 21, and a drive rod 23 coupled to the drive portion 21. The drive portion 21 can be fixed to the main body 10, and be partially received in the first receiving portion 1112. The drive rod 23 can be received in the first receiving portion 21, and can extend to the second receiving portion 1113. The drive portion 21 can drive the drive rod 23 to move along the central axis of the main body 10. In at least one embodiment, the drive member 20 can be a cylinder with screws.

The pin assembly 30 can include a pin bushing 31, a mounting seat 33, a resisting plate 35, and a pin 37. The pin bushing 31 can be mounted on an end of the cover 18 away from the mounting plate 15. The mounting seat 33, the resisting plate 35, and the pin 37 can be received in the receiving chamber 153. The resisting plate 15 can be fixed to the mounting seat 33. The mounting seat 33 can be coupled to the drive member 20. The pin 37 can be coupled to an end of the mounting seat 33 away from the drive member 20, and can extend through the cover 18 and the pin bushing 31.

The pin bushing 31 can include a base portion 311, and a positioning portion 313 extending from an end of the base portion 311. The positioning portion 313 can be substantially hollow and cylindrical. The positioning portion 313 can define a number of expansion slots 3131 on sidewalls. Each expansion slot 3131 can extend along the central axis of the positioning portion 313. In at least one embodiment, the positioning portion can define four expansion slots 3131, and the four expansion slots 3131 can be distributed evenly on sidewalls of the positioning portion 313. The positioning portion 313 can expand under a pressure force to the sidewalls to enlarge.

The mounting seat 33 can be received in the receiving chamber 153, and be coupled to the drive rod 23. The mounting seat 33 can define a groove 331 which extends around a periphery of the mounting seat 33. A sealing ring 332 can be inserted in the groove 331 and can resist the inner sidewalls of the mounting plate 15.

The resisting plate 35 can be fixed to the mounting seat 33, and be inserted in the receiving chamber 153. The resisting plate 35 can define an opening 351 on an outer surface. The opening 351 can extend through two opposite ends of the resisting plate 35, and can extend to an inner portion of the resisting plate 35. The resisting plate 35 can keep a predetermined distance from the inner sides of the mounting plate 15.

The pin 37 can include a shaft portion 371, a connecting portion 373, and an inserting portion 375 coupled consecutively in order. The diameter of the shaft portion 371 can be less than that of the positioning portion 313 which does not expand. The shaft portion 371 can be coupled to the drive rod 23. The diameter of the connecting portion 373 can be gradually enlarged along a direction away from the shaft portion 371, thus an inclined surface 3731 can be formed on the outer sides of the connecting portion 373. When the pin 37 is moved toward the drive portion 21, the connecting portion 373 can press the inner sidewalls of the position portion 313 to enlarge the diameter, thus the positioning portion 313 can resist the sides of the positioning hole 210. The pin 37 can define a channel 377 which extends along the central axis, and a number of through holes 378 which extend through the outside surface of the pin 37 and communicate with the channel 377. In at least one embodiment, one through hole 378 can be arranged on the shaft portion 37 and can communicate with the air chamber 182.

The connecting member 50 can be received in the receiving chamber 153, and can interconnect with the drive member 20 and the mounting seat 33. A first latching portion 51 and a second latching portion 53 can be positioned on opposite ends of the connecting member 50. The first latching portion 51 can be configured to latch the drive rod 23, and the second latching portion 53 can be configured to latch the mounting seat 53. The connecting member 50 can define a gap 55 extending through opposite ends, thus the connecting member 50 can be assembled or disassembled easily.

In assembly, the drive member 20 can be mounted in the base 11; the resisting plate 35 can be fixed on the mounting seat 33, and the pin 37 can extend through the resisting plate 35 to be coupled to the mounting seat 33; the mounting seat 33 can be coupled to the drive member 20 by the connecting member 50; the mounting plate 15, the cover 18, the pin bushing 31 can be coupled to the base 11 consecutively in order, and the pin 37 can extend through the cover 18 and the pin bushing 31, the connecting portion 373 and the inserting portion 375 can be located outside of the positioning portion 313. In at least one embodiment, the mounting plate 15 and the base 11, the cover 18 and the mounting plate 15, the pin bushing 31 and the cover 18 can be respectively coupled together by bolts 60.

In use, the positioning device 100 can be fixed to a working table (not shown) through the mounting holes 183, and the pin 37 can extend through the positioning hole 210, the positioning portion 313 can be received in the positioning hole 210. The drive portion 21 can drive the drive rod 23 to move toward the drive portion 21, thus driving the pin 37 to move toward the drive portion 21 via the mounting seat 23. The connecting portion 373 can press the inner sides of the positioning portion 313, thus the positioning portion 313 can be expanded to enlarge the diameter. In this way, the positioning portion 313 can resist the sides of the positioning hole 210, and the workpiece 200 can be positioned on the working table. After the workpiece is machined, the drive member 20 can drive the pin 37 to move away from the drive portion 21 until the resisting plate 35 resists the bottom surface 181, thus the connecting portion 373 can break away from the inner sides of positioning portion 313, and the diameter of the positioning portion 313 can diminish to an original state. Air can be transported into the channel 377 via the receiving chamber 153, the opening 351, the air chamber 182, and at least one through hole 378 in order, and then the air can be transported out of the pin 37 via the through holes 378. In this way, the air can disperse the impurities attached to the pin 37.

Figure 4:
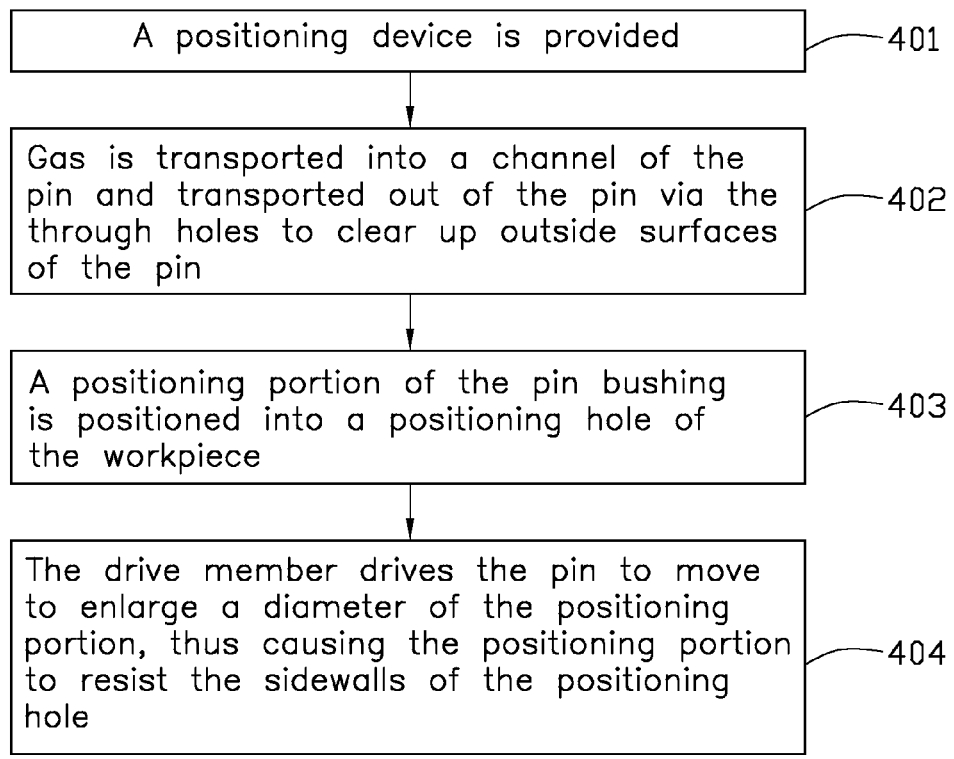
FIG. 4 is a flowchart of a positioning method.

FIG. 4 illustrates a flowchart in accordance with an example embodiment. The example method 400 is provided by way of example, as there are a variety of ways to carry out the method. The method 400 described below can be carried out using the configurations illustrated in FIG. 3, for example, and various elements of these figures are referenced in explaining example method 400. Each block shown in FIG. 4 represents one or more processes, methods or subroutines, carried out in the example method 400. Furthermore, the illustrated order of blocks is by example only and the order of the blocks can change according to the present disclosure. Additional blocks may be added or fewer blocks may be utilized, without departing form this disclosure. The example method 400 for positioning the workpiece 200 can begin at block 401.

At block 401, the positioning device and the workpiece described as above are provided. The positioning device 100 can include a drive member 20, a pin bushing 31, and a pin 37. The pin 37 can be received in the pin bushing 31 and be coupled to the drive member 20. The drive member 20 can drive the pin 37 to move in the pin bushing 37. The workpiece 200 can define a positioning hole 210.

At block 402, gas is transported into the channel of the pin and transported out of the pin via the through holes to clear up outside surfaces of the pin.

At block 403, the positioning portion of the pin bushing is positioned into the positioning hole of the workpiece.

At block 404, the drive member drives the pin to move to enlarge the positioning portion, thus causing the positioning portion to resist the sidewalls of the positioning hole.

In at least one embodiment, the connecting member 50, the mounting seat 33, the resisting plate 35, the mounting plate 15, and the cover 18 can be omitted.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. A positioning device comprising:
    a main body defining a receiving portion which extends through opposite ends of the main body, wherein the main body comprises:
        a base;
        a mounting plate covering the base, the mounting plate defining a receiving chamber, and an inlet hole coupled with the receiving portion on a sidewall of the mounting plate, wherein the receiving portion is defined on the base and adjacent to the receiving chamber; and
        a cover covering the mounting plate;
    a drive member at least partially received in the receiving portion; and
    a pin assembly comprising:
        a pin bushing securely coupled to the cover, and defining an expansion slot on a sidewall which extends along a central axis of the pin bushing;
        a pin coupled to the drive member and extending through the pin bushing, the pin partially and movably received in the receiving chamber, wherein the pin further defines a channel extending along the central axis of the pin bushing and a plurality of through holes coupled with the channel, the plurality of through holes extend through sidewalls of the pin, and at least one of the through holes couples with the receiving portion;
        a mounting seat received in the receiving chamber, coupled to the drive member, and abutting against inner sidewalls of the mounting plate; and
        a resisting plate coupled to the mounting seat and received in the receiving chamber, wherein the resisting plate is configured for resisting the cover and defines an opening on an outer surface, the opening is configured for coupling with the inlet hole and the channel, a shaft portion is coupled to the resisting plate;
    wherein when the drive member drives the pin to move in the pin bushing, the pin presses inner sidewalls of the pin bushing to enlarge a diameter of the pin bushing such that the pin bushing is configured for positioning a workpiece.

2. The positioning device of claim 1, wherein the pin comprises a shaft portion, a connecting portion with an inclined surface, and an inserting portion, the shaft portion is coupled to the connecting portion, the inserting portion is coupled to the connecting portion, and the shaft portion is coupled to the drive member, the connecting portion is received in the pin bushing and configured for pressing the inner sidewalls of the pin bushing.

3. The positioning device of claim 1, wherein the cover defines an air chamber on an end adjacent to the mounting plate, the opening extends through opposite ends of the resisting plate to communicate with the air chamber, at least one of the through holes communicates with the air chamber.

4. The positioning device of claim 3, wherein the resisting plate is positioned at a predetermined distance from the inner sidewalls of the mounting plate.

5. The positioning device of claim 1, wherein the mounting seat defines a groove extending around a periphery of the mounting seat, the positioning device further comprises a sealing ring, the sealing ring is received in the groove and resists the inner sidewalls of the mounting plate.

6. The positioning device of claim 1, wherein the positioning device further comprises a connecting member configured to interconnect with the mounting seat and the drive member.

7. The positioning device of claim 6, wherein the connecting member comprises:
    a first latching portion latching onto the drive member; and
    a second latching portion coupled to the first latching portion and latching onto the mounting seat.

8. The positioning device of claim 6, wherein the connecting member defines a gap extending through opposite ends.

9. The positioning device of claim 1, wherein the positioning device further comprises an inlet connector inserted into the inlet hole and coupled with the receiving portion.

10. The positioning device of claim 1, wherein the drive member comprises a drive portion and a drive rod coupled to the drive portion, the drive portion is securely received in the receiving portion, is coupled to the pin, and is configured for driving the drive rod to move along the central axis of the pin bushing.

11. A positioning method applied to the positioning device of claim 1 to position the workpiece, the workpiece defining a positioning hole, the method comprising:
    positioning the pin bushing into the positioning hole; and
    driving the pin to move to enlarge the pin bushing to resist sidewalls of the positioning hole;
    providing air to the channel through the inlet hole, and transporting the air out of the channel through the through holes.

* * * * *